United States Patent
Pham

(10) Patent No.: US 9,440,884 B1
(45) Date of Patent: Sep. 13, 2016

(54) EPOXY GROUT SYSTEMS FOR STANDARD AND CHEMICALLY RESISTANT INSTALLATIONS

(71) Applicant: Custom Building Products, Inc., Seal Beach, CA (US)

(72) Inventor: Anthony D. Pham, Fountain Valley, CA (US)

(73) Assignee: CUSTOM BUILDING PRODUCTS, INC., Seal Beach, CA (US)

( * ) Notice: Subject to any disclaimer, the term of this patent is extended or adjusted under 35 U.S.C. 154(b) by 42 days.

(21) Appl. No.: 14/289,511

(22) Filed: May 28, 2014

Related U.S. Application Data

(60) Provisional application No. 61/828,087, filed on May 28, 2013.

(51) Int. Cl.

| | |
|---|---|
| *C08K 3/34* | (2006.01) |
| *C08K 3/36* | (2006.01) |
| *C08K 3/40* | (2006.01) |
| *C08L 63/02* | (2006.01) |
| *C08L 63/04* | (2006.01) |
| *C09D 5/34* | (2006.01) |
| *C09D 163/02* | (2006.01) |
| *C09D 163/04* | (2006.01) |
| *C04B 26/14* | (2006.01) |
| *C08K 3/00* | (2006.01) |
| *C08L 63/00* | (2006.01) |
| *C09D 163/00* | (2006.01) |

(52) U.S. Cl.
CPC ............ *C04B 26/14* (2013.01); *C08K 3/0033* (2013.01); *C08K 3/34* (2013.01); *C08K 3/346* (2013.01); *C08K 3/36* (2013.01); *C08K 3/40* (2013.01); *C08L 63/00* (2013.01); *C08L 63/04* (2013.01); *C09D 5/34* (2013.01); *C09D 163/00* (2013.01)

(58) Field of Classification Search
None
See application file for complete search history.

(56) References Cited

U.S. PATENT DOCUMENTS

| 2,990,383 | A | * | 6/1961 | Glaser | C08L 63/00 528/120 |
|---|---|---|---|---|---|
| 3,062,773 | A | * | 11/1962 | Rogier | C08G 69/26 525/423 |
| 5,789,520 | A | * | 8/1998 | Karasawa | C07C 233/35 528/122 |
| 2004/0134163 | A1 | * | 7/2004 | Rooshenas | C04B 14/06 52/742.16 |
| 2008/0255271 | A1 | * | 10/2008 | Raymond | C04B 26/14 523/437 |
| 2009/0044727 | A1 | * | 2/2009 | Garuti, Jr. | C04B 24/281 106/802 |
| 2012/0115990 | A1 | * | 5/2012 | Wang | C08G 59/38 523/427 |

FOREIGN PATENT DOCUMENTS

WO   WO 93/21125 A1 * 10/1993 ............. C04B 26/14

* cited by examiner

*Primary Examiner* — Robert Sellers
(74) *Attorney, Agent, or Firm* — Porter Wright Morris & Arthur LLP

(57) ABSTRACT

An epoxy grout system comprises a first epoxy resin component comprising a novolac epoxy resin, a bisphenol F epoxy resin, and a non-reactive diluent, and a second epoxy curing agent component comprising an amidoamine. The epoxy grout system has excellent chemical resistance while maintaining good installation properties. Another epoxy grout system comprises a first epoxy resin component which is resistant to a mixture of oleic acid and water, a second epoxy resin component which is less resistant to a mixture of oleic acid and water than the first component, and a third amine-containing curing agent component operable to cure both the first and second epoxy resin components. Optionally, the curing agent component can be provided as a plurality of amine-containing curing agent components of respective colors, whereby a user can select a curing agent component of a desired color for use with either the first or second epoxy resin component.

24 Claims, No Drawings

EPOXY GROUT SYSTEMS FOR STANDARD AND CHEMICALLY RESISTANT INSTALLATIONS

FIELD OF THE INVENTION

The present invention is directed to epoxy grout systems having good chemical resistance while allowing easy installation, and to versatile epoxy grout systems allowing a user to select components for use in standard applications or applications requiring chemical resistance.

BACKGROUND

The installation of decorative tiles (e.g. ceramic, porcelain, stone, or tiles of another material) or stones on a floor or wall includes the steps of adhering the stone or tile to the substrate using a tile-setting adhesive, followed by filling the joints between the individual tiles with a grout material that is plastic (i.e. deformable) in its initial state, but over a short period of time, typically one to 24 hours, becomes a hard and impenetrable mass that permanently fills the joints between the individual tiles. During the installation of the grout, the grout is in a plastic state and is floated or smeared over the tile surface, filling all joints level with the surface of the stone or tile floor or wall covering. After an optional pre-setting period for the grout to develop additional cohesion, the surface of the tile or stone is cleaned with water (sometimes treated with a detergent), leaving the tile or stone surface free of grout and the joints filled with the grout. Grouts provide several functions to the tile floor including supporting the edges of the tile or stone to prevent chipping of the edges, preventing dirt and debris from filling the joints, and providing a decorative appearance since the grouts are often colored to compliment the other colors within an architectural space.

Grouts used for tile or stone installation are often based on hydraulic cement binders such as ordinary Portland cement (OPC) or aluminate or aluminosulfate cements. Grouts based on OPC are used in the majority of applications because of the easy installation properties, excellent durability and low cost. However, OPC-based grouts suffer several deficiencies, including efflorescence, mottling and color variation due to inconsistent curing throughout the grout, poor stain resistance, and poor chemical resistance, especially to acidic chemicals. Grouts based on aluminate or aluminosulfate cements can, depending on formulation, overcome the efflorescence, mottling and color variation; however, they still suffer from poor stain resistance and poor chemical resistance.

Alternatively, the binder in a grout can be based on dispersion polymers, such as polyurethane dispersions (PUDs) or a variety of polyacrylate dispersions. Grouts based on dispersion polymers are color consistent, non-efflorescent and non-mottling. Chemical resistance and stain resistance of these grouts can be good. However, grouts based on dispersion polymers are slower to cure and typically softer in the final cured state relative to cement-based grouts. Also, typical dispersion-based grouts are less resistant to water and tend to soften when continuously submerged.

In a third variety of tile or stone setting grout, the binder is based on thermosetting chemicals such as epoxy resins. Epoxy grouts are typically two-component reactive materials comprised of a first part that contains an epoxy resin and a second part that contains an amine hardener. Also contained in the first or second part are fillers such as sand or fine limestone, rheology modifiers, and coloring agents, to name a few convential components. Alternatively, the fillers, rheology modifiers, and coloring agents may comprise a third component that is added to the first two components. The component that contains the color is usually replicated in multiple colors to provide color alternatives to the architect or designer.

Due to the reactive nature of epoxy grouts, deficiencies observed for hydraulic cement-based grouts and dispersion polymer-based grouts are largely absent. Epoxy grouts are color consistent, non-efflorescing and non-mottling, typically have very good stain resistance, and are resistant to many chemicals depending on the exact epoxy and hardener combinations that are employed. Epoxy grouts cure rapidly to form a hard and durable mass that is insensitive to water. However, epoxy grouts are considered difficult to install, both during the floating process when filling the joints, and afterwards during clean up with water, owing, in part, to their rheology and viscosity and their adhesion to tile and stone surfaces.

To achieve better installation properties, those familiar with the art can formulate epoxy grouts with improved rheology by using water-borne epoxy resins (see for instance U.S. Pat. No. 6,881,768), low viscosity epoxy resins based on bisphenol-epoxy A or bisphenol-epoxy F, or, alternatively, using reactive mono- or di-functional diluents such as $C_{12}$ and $C_{14}$ monoglycidylether or 1,4-butanedioldiglycidyl ether available from various manufacturers. The rheology of many commercially available bis-phenol A or bis-phenol F epoxy resins is adjusted by the manufacturer using these reactive diluents prior to their use in epoxy grout formulations.

Better installation properties can also be improved using water soluble amines in the hardener side of the formulation. Amidoamines, or combinations of amidoamines with non-amidoamines, dramatically improve the ability to clean the surface of the tile after floating (filling) the grout into the joints.

These formulation approaches to improve installation properties are well known to those skilled in the art. Unfortunately, the use of viscosity lowering resins or additives, and the use of amidoamines, limits the resistance of epoxy grouts to many chemicals such as organic acids, solvents such as tolune, methyl ethyl ketone, methanol, and xylene, and gasoline. The recent advent of enzymatic cleaners has created a particularly challenging chemical environment in commercial kitchens that utilize deep fat fryers. Oils that splash on the floor are cleaned with the enzymatic cleaners. These so-called "no rinse" cleaners are left to dwell on the floor, giving the enzyme time to break down the oils into the corresponding glycerol and fatty acids. A predominant fatty acid in cooking oils is oleic acid, a monofunctional acid, which is especially degrading to epoxy grouts, requiring the grout used in commercial kitchens to have exceptional oleic acid resistance.

While not wanting to be constrained by theory, it is hypothesized that oleic acid (among others) can undergo transamidation reactions with the amidoamine hardener, thereby leading to non-crosslinking, monofunctional amines.

Thus, epoxy grout formulations that retain relatively good chemical resistance typically have poor installation properties. For this reason, manufacturers of epoxy grouts often produce two product lines (with multiple colors in each line), one product line with good working properties but inferior chemical resistance, and a second that is dedicated for use in environments that require superior chemical resistance such as dairies, breweries, chemical plants, commercial garages, and commercial kitchens. These two product lines have unique epoxy resin and amine hardener parts relative to each other. The product line with easier installation properties contains lower molecular weight epoxy components including reactive diluents, and amidoamines, while the product line with superior chemical resistance utilizes epoxy resins with higher viscosity, without reactive diluents, and does not use amidoamines.

Two full product lines create difficulties for both the manufacturer of the epoxy grout as well as the distributor or seller of the grout. For the manufacturer, maintaining color consistency across two product lines is difficult because the chemical constituents for each grout product line are different and can have different underlying (i.e. unpigmented) appearances, often requiring different coloring components for each product line. Additionally, both the manufacturer and the distributor or seller must maintain two product lines, thereby increasing inventory and the associated space needs and cost.

Thus, there is a need for an epoxy grout system that has excellent chemical resistance while maintaining good installation properties. Additionally, and in order to minimize manufacturing, distribution and display and sale challenges and inefficiencies, there is a need for a grout system that minimizes the number of components over various product lines, each comprising multiple colors, while still providing a variety of well-matched colors that are common to both product lines.

SUMMARY OF THE INVENTION

The various epoxy grout systems of the present invention overcome one or more disadvantages of the prior art.

In one embodiment, the invention is directed to an epoxy grout system which comprises a first epoxy resin component comprising a novolac epoxy resin, a bisphenol F epoxy resin, and a non-reactive diluent, and a second epoxy curing agent component comprising an amidoamine. The epoxy grout system has excellent chemical resistance while maintaining good installation properties.

In another embodiment, the invention is directed to an epoxy grout system which comprises a first epoxy resin component which is resistant to a mixture of oleic acid and water, a second epoxy resin component which is less resistant to a mixture of oleic acid and water than the first epoxy resin component, and a third amine-containing curing agent component that is operable to cure both the first epoxy resin component and the second epoxy resin component. In more specific embodiments, the third amine-containing curing agent component can be provided as a plurality of amine-containing curing agent components of respective colors, whereby a user can select an amine-containing curing agent component of a desired color for use with either the first epoxy resin component or the second epoxy resin component. The epoxy grout system minimizes manufacturing, distribution and display and sale challenges and inefficiencies by minimizing the number of components to provide both a standard epoxy grout product line and a chemically resistant epoxy grout product line with color selections that are common to both product lines.

Additional embodiments and advantages of the epoxy grout systems of the invention will be more fully apparent in view of the detailed description of the invention.

DETAILED DESCRIPTION

In a first embodiment of the invention, an epoxy grout system provides excellent resistance to chemicals, including oleic acid and mixtures of oleic acid with water, relative to other commercially available "standard grade" and "industrial grade" epoxy grouts. While having excellent chemical resistance, the inventive epoxy grout system retains excellent installation properties, facilitating filling of joints between tiles and the like during floating and easy cleaning of the tile surfaces. The epoxy grout system comprises a first epoxy resin component comprising a novolac epoxy resin, a bisphenol F epoxy resin, and a non-reactive diluent, and a second epoxy curing agent component comprising an amidoamine.

Bisphenol F is a reaction product of phenol and formaldehyde. Bisphenol F is reacted with epichlorohydrin to form bisphenol F epoxy resins. The viscosity of bisphenol F epoxy resins is typically about 2,500-5,000 centipoises (cPs), and the epoxy functionality is typically from about 1.9 to 2.1. Any bisphenol F resin may be used in the epoxy grout systems of the invention.

Novolac, like bisphenol F, is a reaction product of phenol and formaldehyde, but formed using excess phenol. Novolac resins are formed by reaction of novolac with epichlorohydrin. The viscosity of novolac resins is typically in the range of about 20,000-50,000 cps, significantly higher than that of bisphenol F resins, and the epoxy functionality is typically from about 2 to 6. Any novolac resin may be used in the epoxy grout systems of the invention. In specific embodiments of the present invention, the novolac resin has an epoxy functionality of about 3 to 5, or, more specifically, from about 3 to 4.

The bisphenol F epoxy resin and the novolac epoxy resin are used in amounts sufficient to provide the epoxy grout system with the desired high chemical resistance. In one embodiment, the first epoxy resin component comprises the bisphenol F epoxy resin in an amount of about 10-30 wt %, more specifically about 15-20 wt %, based on the weight of the first epoxy resin component. In further embodiments, the first epoxy resin component comprises the novolac epoxy resin in an amount of about 1-10 wt %, more specifically, about 1-5 wt %, or yet more specifically, about 1-3 wt %, based on the weight of the first epoxy resin component.

Surprisingly, the non-reactive diluent reduces the overall viscosity, providing excellent installation properties, for example, in a range of about 220,000 to 300,000 cps, without compromising the high chemical resistance, even in the presence of an amidoamine curing agent component. In one embodiment, the high chemical resistance is evident by resistance to a 1:1 weight ratio mixture of oleic acid and water, as the epoxy grout system forms an epoxy grout which exhibits a passing grade according to ASTM C267. In one embodiment, the non-reactive diluent comprises benzyl alcohol. Other non-reactive diluents can be used, provided they maintain the high chemical resistance. The non-reactive diluent is used in an amount sufficient to provide the epoxy grout with a desired viscosity, for example, in a range of about 220,000 to 300,000 cps. In specific embodiments, the non-reactive diluent is used in an amount of about 1-15 wt %, more specifically, 1-10 wt %, or even more specifically, 1-4 wt %, based on the weight of the epoxy grout formed by mixing the respective components.

While not wishing to be constrained by theory, it is believed that the bisphenol F and novolac epoxy resins in combination with a non-reactive diluent such as benzyl alcohol allows the reduction of the viscosity while not consuming the reactive functionality of either the novolac epoxy resin or the amine hardener, as would be the case if reactive diluents were used. In this way, the novolac/amine system retains its ability to provide a fully cross-linked matrix maintaining the desired chemical resistance expected of the novolac resin. It is believed that the mobility of the low molecular weight non-reactive diluent allows the epoxy reaction to occur even after a significant matrix has formed during the earlier stages of the reaction. That benzyl alcohol is effective as the non-reactive diluent may demonstrate that a catalytic function is also required of the diluent. Benzyl alcohol is a known catalyst for the reaction between epoxies and amines.

Amidoamine curing agents are well known in the art and are made by reacting aliphatic polyamines with fatty acids. Any amidoamine known in the art is suitable for use in the present epoxy grout systems. As noted above, surprisingly, the high chemical resistance of the novolac epoxy resin is not compromised by the amidoamine curing agent component. In a specific embodiment, the amidoamine curing agent component comprises the amidoamine epoxy hardener that is commercially available from Custom Building Products, Inc. under the name CEG-Lite Part A (available in 28 colors). The curing agent component may, optionally, include one or more additional amine curing agents, if desired, provided the additional curing agent(s) do not lower the chemical resistance of the resulting epoxy grout. The curing agent component is employed in an amount that provides a stoichiometric ratio of amine to epoxy sites in a range of about 0.9 to 1.1.

The epoxy grout system may further comprise additional components. For example, the epoxy grout system may contain a filler, or more specifically, a silica material. In a more specific embodiment, the epoxy grout system includes sand and/or recycled glass, or other silica material. In a further embodiment, the first epoxy resin component includes a silica material, for example sand and/or recycled glass. In a more specific embodiment, the first epoxy resin component includes a silica material, for example sand and/or recycled glass in an amount of about 40 to 80 wt %, based on the weight of the first epoxy resin component.

The epoxy grout system may further comprise a colored pigment in the first component or the second component, or added as a third component. In a specific embodiment, the second curing agent component includes a colored pigment. The epoxy grout system may further comprise viscosity and thixotropy modifying agents to fine tune the rheological properties of the grout, and/or an adhesion promoter, for example, an epoxy silane, to improve interfacial tile adhesion, and/or other conventional additives, provided they do not compromise the high chemical resistance of the inventive epoxy grout system. These various components may be provided in the first component or the second component, or added as one or more third components. In a specific embodiment, the first epoxy resin component includes an adhesion promoter, for example, an epoxy silane.

In a second embodiment, the invention is directed to a versatile epoxy grout system which facilitates manufacture, distribution, display and sale of both standard and chemically resistant product lines. The epoxy grout system comprises a first epoxy resin component which is resistant to a mixture of oleic acid and water, a second epoxy resin component which is less resistant to a mixture of oleic acid and water than the first epoxy resin component, and a third amine-containing curing agent that is operable to cure both the first epoxy resin component and the second epoxy resin component. In a specific embodiment, the third amine-containing curing agent is operable to cure both the first epoxy resin component and the second epoxy resin component at the same mixing proportion.

In more specific embodiments, the third amine-containing curing agent component contains colored pigment and can be provided as a plurality of amine-containing curing agent components of respective colors, whereby a user can select an amine-containing curing agent component of a desired color for use with either the first epoxy resin component or the second epoxy resin component. The epoxy grout system minimizes manufacturing, distribution and display and sale challenges and inefficiencies by minimizing the number of components to provide both a standard epoxy grout product line and a chemically resistant epoxy grout product line with color selections that are common to both product lines.

In another specific embodiment, the third amine-containing curing agent contains an amidoamine, alone or in combination with one or more additional amine curing agents, if desired, provided the additional curing agent(s) do not lower the chemical resistance of the resulting epoxy grout formed using the first epoxy resin component. The third amine curing agent component is employed in an amount that provides a stoichiometric ratio of amine to epoxy sites in a range of about 0.9 to 1.1.

The first epoxy resin component of this epoxy grout system comprises a novolac epoxy resin, a bisphenol F epoxy resin, and a non-reactive diluent, for example, as described in the first embodiment of the invention, while the second epoxy resin component of this epoxy grout system comprises a bisphenol A epoxy resin, a bisphenol F epoxy resin, or a bisphenol A epoxy resin and a bisphenol F epoxy resin. Bisphenol A is a reaction product of phenol and acetone and is reacted with epichlorohydrin to form bisphenol A resin. The viscosity of bisphenol A epoxy resins is typically about 11,000-15,000 cps and the epoxy functionality is typically about 1.9 or less. Any bisphenol A resin may be used in the epoxy grout systems of the invention. In a more specific embodiment, the second epoxy resin component is free of novolac epoxy resin.

Either or both resin components, or the amine-containing curing agent component, may further comprise fillers, viscosity and thixotropy modifying agents to fine tune the rheological properties of the grout, and/or an adhesion promoter, for example, an epoxy silane, to improve interfacial tile adhesion, and/or other conventional additives. Alternatively, such additional components may be provided in one or more fourth components. In a further embodiment, the first resin component and the second resin component include a silica filler material, for example, sand and/or recycled glass. In a more specific embodiment, the first resin component and the second resin component include a silica material, for example sand and/or recycled glass, in an amount of about 40 to 80 wt %, based on the weight of the first epoxy resin component.

In this second embodiment of the invention, the inventive grout provides a system whereby two unique epoxy resin formulas can be used independently with one of a plurality of different colored amine-containing curing agents to provide either "Standard Grade" performance or "Industrial Grade" high chemical resistance performance, thereby reducing the number of hardener parts needed to inventory a full line of epoxy grout products, and facilitating manufacture, distribution, display and sale of the products.

Various features of the invention are demonstrated in the following examples:

Example 1

In this example, a chemically resistant epoxy grout system according to the invention, Inventive Grout, is compared with various commercial products for chemical resistance, as shown in Table 1. The Inventive Grout contained the following respective components, in wt % based on the weight of the epoxy grout:

| Ingredient | Amount (wt %) |
|---|---|
| Epoxy resin component | |
| Bispenol F | 10-20 |
| Novolac | 1-3 |
| Benzyl Alcohol | 1-4* |
| Glass | 5-15 |
| Sand | 50-80* |
| Clay Thixotrope | 0.5-2 |
| Defoamer | 0.01-0.2 |
| Silane-epoxy adhesion promoter | 0.01-0.2 |
| Amidoamine during agent component | |
| Isophorone diamine curing agent | 0.8-1.5 |
| Amidoamine curing agent | 2.5-7 |
| pigment | 0.2-1.5 |
| fumed silica thickener | 0.08-.2 |

* Sand and benzyl alcohol were included in both components, but the combined amounts of each are listed in the epoxy resin component.

As is known in the art, amidoamines, while aiding the water washability of the grout formulation, have significant negative effects on chemical resistance. This can be seen in Comparative Example 1, commercially available from Custom Building Products, Inc. under the trade name of CEG-Lite, which is not resistant to several challenging chemicals including oleic acid and oleic acid/water (1:1 weight ratio mixtures). Surprisingly, the Inventive Grout, while utilizing an amidoamine-based hardener, is both chemically resistant and retains the water cleanability. The viscosity of the Inventive Grout is about 265,000 cps. Only Comparative Example 7 has similar chemical resistance; however, Comparative Example 7 has exceedingly high viscosity, about 374,000 cps, and is very difficult to float and fill the tile joints with the composition.

Example 2

In this example, different diluents are combined with epoxy resins and an amidoamine curing agent and the chemical resistance to a 1:1 weight ratio oleic acid/water mixture after 7 days is assessed according to ASTM C267. The results are shown in Table 2.

TABLE 1

| | Organic Acids | | | | Inorg Acid | Industrial Solvents | | | | | Other | | | |
|---|---|---|---|---|---|---|---|---|---|---|---|---|---|---|
| | Oleic Acid 100% | Oleic Acid 50% | Acetic Acid, 10% | Formic Acid 5% | Phosphoric Acid 80% | MEK | Toluene | Chloroform | Methylene Chloride | Xylene | Gasoline | Methanol | Hydrogen Peroxide | Total |
| Inventive Grout | 1 | 1 | 1 | 1 | 1 | 1 | 1 | 0 | 0 | 1 | 1 | 1 | 1 | 11 |
| Commercially Available "Standard Grade" Epoxy Grouts | | | | | | | | | | | | | | |
| Comparative Example 1 (CEG-Lite) | 0 | 0 | 1 | 1 | 1 | 0 | 0 | 0 | 0 | 0 | 0 | 1 | 1 | 5 |
| Comparative Example 2 (Kerapoxy) | 0 | 0 | 1 | 1 | 1 | 0 | 0 | 0 | 0 | 0 | 0 | 1 | 1 | 5 |
| Comparative Example 3 (Kerapoxy CQ) | 0 | 0 | 1 | 0 | 1 | 0 | 0 | 0 | 0 | 1 | 0 | 0 | 0 | 3 |
| Comparative Example 4 (Opti Color) | 0 | 0 | 0 | 1 | 1 | 0 | 1 | 0 | 0 | 1 | 0 | 0 | 1 | 5 |
| Comparative Example 5 (Spectralock Pro) | 0 | 0 | 1 | 1 | 1 | 1 | 1 | 0 | 0 | 1 | 1 | 1 | 1 | 9 |
| Commercially Available "Industrial Grade" Epoxy Grouts | | | | | | | | | | | | | | |
| Comparative Example 6 (Kerapoxy IEG) | 1 | 0 | 1 | 1 | 0 | 1 | 0 | 0 | 0 | 1 | 1 | 1 | 1 | 8 |
| Comparative Example 7 (SpectraLock 2000IG) | 1 | 1 | 1 | 1 | 1 | 0 | 1 | 0 | 0 | 1 | 1 | 1 | 1 | 10 |

TABLE 2

Resistance to Oleic Acid/Water Mixture (ASTM C267)

| Diluent | Type of Epoxy Resin | | |
|---|---|---|---|
| | Bis A | Bis F | Novolac |
| 1,4-butanediol diglycidyl ether | F | F | F |
| Aliphatic (neopentyl glycol) diglycidyl ether | F | F | F |
| Monoglycidyl ether of C12-C14 alcohol | F | F | F |
| Low viscosity hydrocarbon resin | F | F | F |
| Cresyl glycidyl ether | F | F | F |
| Trimethylpropane triglycidyl ether | F | F | F |
| Benzyl Alcohol - Invention | F | F | P |

As is shown in Table 2, the use of common mono- and/or difunctional reactive diluents degrades the chemical resistance relative to the inventive example using a combination of novolac resin and the non-reactive diluent benzyl alcohol.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification, embodiments and examples be considered as exemplary only, with a true scope and spirit of the invention being indicated by the following claims.

What is claimed:

1. An epoxy grout system, comprising (a) a first epoxy resin component comprising about 1-10 wt % of a novolac epoxy resin, and about 10-30 wt % of a bisphenol F epoxy resin, both based on the weight of the first epoxy resin component, and a non-reactive diluent, and (b) a second epoxy curing agent component comprising an amidoamine.

2. The epoxy grout system of claim 1, wherein the novolac epoxy resin has epoxy functionality in a range of from about 2 to 6.

3. The epoxy grout system of claim 1, wherein the novolac epoxy resin has epoxy functionality in a range of from about 3 to 5.

4. The epoxy grout system of claim 1, wherein the novolac epoxy resin has epoxy functionality in a range of from about 3 to 4.

5. The epoxy grout system of claim 1, wherein the first epoxy resin component comprises the bisphenol F epoxy resin in an amount of about 15-20 wt %, based on the weight of the first epoxy resin component.

6. The epoxy grout system of claim 1, wherein the first epoxy resin component comprises the novolac epoxy resin in an amount of about 1-5 wt %, based on the weight of the first epoxy resin component.

7. The epoxy grout system of claim 1, wherein the first epoxy resin component comprises the novolac epoxy resin in an amount of about 1-3 wt %, based on the weight of the first epoxy resin component.

8. The epoxy grout system of claim 1, wherein the non-reactive diluent is benzyl alcohol.

9. The epoxy grout system of claim 1, further comprising sand and/or recycled glass.

10. The epoxy grout system of claim 1, wherein the grout is chemically resistant to a mixture of oleic acid and water.

11. The epoxy grout system of claim 1, wherein pigment is included in the second epoxy curing agent component.

12. The epoxy grout system of claim 1, wherein the first epoxy resin component includes an adhesion promoter.

13. An epoxy grout system, comprising a first epoxy resin component which is chemically resistant to a mixture of oleic acid and water, a second epoxy resin component which is less chemically resistant to a mixture of oleic acid and water than the first epoxy resin component, and a third amine-containing curing agent that is operable to cure both the first epoxy resin component and the second epoxy resin component, wherein the first epoxy resin component comprises from about 1-10 wt % of a novolac epoxy resin, from about 10-30 wt % of a bisphenol F epoxy resin, and a non-reactive diluent, and wherein the second epoxy resin component comprises a bisphenol A epoxy resin, a bisphenol F epoxy resin, or a bisphenol A epoxy resin and a bisphenol F epoxy resin.

14. The epoxy grout system of claim 13 in which the amine-containing curing agent is operable to cure both the first epoxy resin component and the second epoxy resin component at the same mixing proportion.

15. The epoxy grout system of claim 13 wherein the amine-containing curing agent contains an amidoamine.

16. The epoxy grout system of claim 13 wherein the second resin component is free of novolac epoxy resin.

17. The epoxy grout system of claim 13 wherein the second resin component comprises pigment.

18. An epoxy grout system, comprising (a) a first epoxy resin component comprising a novolac epoxy resin, a bisphenol F epoxy resin, and a non-reactive diluent comprising benzyl alcohol, and (b) a second epoxy curing agent component comprising an amidoamine, wherein an epoxy grout formed from the combination of (a) and (b) has a viscosity in a range of about 220,000 to 300,000 cps.

19. The epoxy grout system of claim 18, wherein the first epoxy resin component comprises the bisphenol F epoxy resin in an amount of about 10-30 wt %, based on the weight of the first epoxy resin component.

20. The epoxy grout system of claim 18, wherein the first epoxy resin component comprises the novolac epoxy resin in an amount of about 1-10 wt %, based on the weight of the first epoxy resin component.

21. The epoxy grout system of claim 1, further comprising a silica material in an amount of about 40 to 80 wt %, based on the weight of the first epoxy resin component.

22. The epoxy grout system of claim 1, wherein the second epoxy curing agent component is included in an amount that provides a stoichiometric ratio of amine to epoxy sites in the first epoxy resin component in a range of about 0.9 to 1.1.

23. The epoxy grout system of claim 18, wherein the first epoxy resin component and the second epoxy resin component each further comprise a silica material in an amount of about 40 to 80 wt %, based on the weight of the respective epoxy resin component.

24. The epoxy grout system of claim 18, wherein the third amine-containing curing agent is included in an amount that provides a stoichiometric ratio of amine to epoxy sites in the first epoxy resin component or in the second epoxy resin component in a range of about 0.9 to 1.1.

* * * * *